US008844772B2

(12) United States Patent
Kim

(10) Patent No.: US 8,844,772 B2

(45) Date of Patent: Sep. 30, 2014

(54) SYSTEMS AND METHODS OF BEVERAGE DISPENSING WITH ROTARY AGITATION

(75) Inventor: Doojin Kim, Kwangjoo-shi (KR)

(73) Assignee: Tiger Company Ltd. (KR)

( * ) Notice: Subject to any disclaimer, the term of this patent is extended or adjusted under 35 U.S.C. 154(b) by 31 days.

(21) Appl. No.: 13/591,189

(22) Filed: Aug. 21, 2012

(65) Prior Publication Data

US 2013/0068795 A1 Mar. 21, 2013

(30) Foreign Application Priority Data

Sep. 20, 2011 (KR) ........................ 10-2011-0094761

(51) Int. Cl.

*G01F 11/00* (2006.01)
*B67D 3/00* (2006.01)
*B67D 1/00* (2006.01)

(52) U.S. Cl.

CPC ............ *B67D 3/0025* (2013.01); *B67D 3/0061* (2013.01); *B67D 1/0047* (2013.01)

USPC ........ 222/233; 222/226; 222/235; 222/185.1; 222/1

(58) Field of Classification Search

USPC ............. 366/192–196, 314; 99/287; 222/235, 222/236, 248, 1, 226, 233, 505, 509, 185.1, 222/227

See application file for complete search history.

(56) References Cited

U.S. PATENT DOCUMENTS

| | | | | |
|---|---|---|---|---|
| 993,188 | A * | 5/1911 | Muokley | 177/120 |
| 1,601,862 | A * | 10/1926 | Legg et al. | 222/235 |
| 1,892,547 | A * | 12/1932 | Benham et al. | 222/244 |
| 2,985,339 | A * | 5/1961 | Fischer et al. | 222/44 |
| 3,042,265 | A * | 7/1962 | Rodth | 222/146.5 |
| 3,223,290 | A * | 12/1965 | Schuld | 222/228 |
| 3,747,811 | A * | 7/1973 | Lewis et al. | 222/233 |
| 6,527,433 | B2 * | 3/2003 | Daniels, Jr. | 366/205 |

* cited by examiner

*Primary Examiner* — Frederick C Nicolas
*Assistant Examiner* — Bob Zadeh
(74) *Attorney, Agent, or Firm* — Benjamin A. Balser; Balser & Grell IP Law

(57) ABSTRACT

Disclosed is a rotary agitation beverage dispenser in which an agitator impeller is mechanically rotated when a user operates a beverage discharge valve to agitate a beverage in a container, the dispenser being usable everywhere without requiring electricity. The dispenser includes a container in which a beverage is received, an agitator impeller mounted in the container and adapted to agitate the beverage by rotation thereof about a rotating shaft that is rotatably mounted on a surface of the container, a discharge valve mounted to one side of the container so as to communicate with the interior of the container and adapted to discharge the beverage out of the container when operated by a user, and an agitator drive unit connected to the discharge valve and the rotating shaft of the agitator impeller and adapted to rotate the agitator impeller in linkage with operation of the discharge valve.

11 Claims, 7 Drawing Sheets

SYSTEMS AND METHODS OF BEVERAGE DISPENSING WITH ROTARY AGITATION

CROSS-REFERENCE TO RELATED APPLICATION

This application claims benefit to Application No. 10-2011-0094761, filed on Sep. 20, 2011 in the Republic of Korea, which is incorporated by reference herein.

TECHNICAL FIELD

The present disclosure is generally related to beverage systems and, more particularly, is related to beverage dispensing with rotary agitation.

BACKGROUND

In general, a beverage dispenser is an apparatus that is installed at an appropriate place, such as a restaurant or a lounge, for example, to assist a user in easily dispensing and drinking beverages with a simple operation of pushing a beverage discharge valve by hand or by using a cup.

With recent diversification in the kinds of beverages, and, moreover, due to a tendency of emphasizing health, high density juice beverages containing a great amount of pulp, such as puree, for example, have become popular.

However, in these juice beverages containing a great amount of pulp, the pulp may settle over time to the bottom of a container by gravity, which may cause an excessive amount of the pulp to be discharged upon discharge of beverage, or, on the contrary, may cause only juice to be discharged without discharge of the pulp.

To solve this problem, there has been proposed use of an agitation device in which an agitator impeller is rotatably installed in a dispenser, and is rotated by a motor to ensure that pulp is uniformly mixed in a beverage rather than being settled.

However, in the case of the above described agitation device using the motor, completely shielding the device from liquid to protect electric elements is necessary due to the use of electricity. For this reason, the agitation device suffers from several problems, such as complicated design and configuration, and is required to pass designated electricity safety criteria. Therefore, there are heretofore unaddressed needs with previous solutions in beverage dispensing.

SUMMARY

Example embodiments of the present disclosure provide systems of beverage dispensing with rotary agitation. Briefly described, in architecture, one example embodiment of the system, among others, can be implemented as follows: a container in which a beverage is received; an agitator impeller mounted in the container, the agitator impeller being adapted to agitate the beverage by rotation thereof about a rotating shaft that is rotatably mounted on a surface of the container; a discharge valve mounted to one side of the container so as to communicate with the interior of the container, the discharge valve being adapted to discharge the beverage out of the container when operated by a user; and an agitator drive unit connected to the discharge valve and the rotating shaft of the agitator impeller, the agitator drive unit being adapted to rotate the agitator impeller in linkage with operation of the discharge valve.

Embodiments of the present disclosure can also be viewed as providing methods for beverage dispensing with rotary agitation. In this regard, one embodiment of such a method, among others, can be broadly summarized by the following steps: providing a beverage in a container; agitating the beverage with an agitator impeller, the agitator impeller adapted to agitate the beverage by rotation thereof about a rotating shaft that is rotatably mounted on a surface of the container; and rotating the agitator and discharging the beverage when a discharge valve is operated.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present disclosure relates to a beverage dispenser of a rotary agitation type, and more particularly to a beverage dispenser of a rotary agitation type in which a beverage, such as, for example, juice containing pulp, is automatically agitated in a mechanical manner when the beverage is discharged from the dispenser, which ensures uniform mixing of the pulp in the beverage, the beverage dispenser being usable everywhere without requiring electricity.

Example embodiments disclosed herein provide a beverage dispenser of a rotary agitation type, in which an agitator impeller may be mechanically rotated in linkage with a user operation of operating a beverage discharge valve without using electricity, which may ensure that a beverage within a container is agitated such that solid ingredients, such as pulp, for example, are uniformly mixed in the beverage, and the beverage dispenser of a rotary agitation type may be used everywhere without requiring electricity.

In accordance with the systems and methods of beverage dispensing with rotary agitation disclosed herein, the above and other objects may be accomplished by the provision of a beverage dispenser of a rotary agitation type, including a container in which a beverage may be received, an agitator impeller mounted in the container, the agitator impeller being adapted to agitate the beverage by rotation thereof about a rotating shaft that may be rotatably mounted on a surface of the container, a discharge valve mounted to one side of the container so as to communicate with the interior of the container, the discharge valve being adapted to discharge the beverage out of the container when operated by a user, and an agitator drive unit connected to the discharge valve and the rotating shaft of the agitator impeller, the agitator drive unit being adapted to rotate the agitator impeller in linkage with operation of the discharge valve.

Figure 1A:
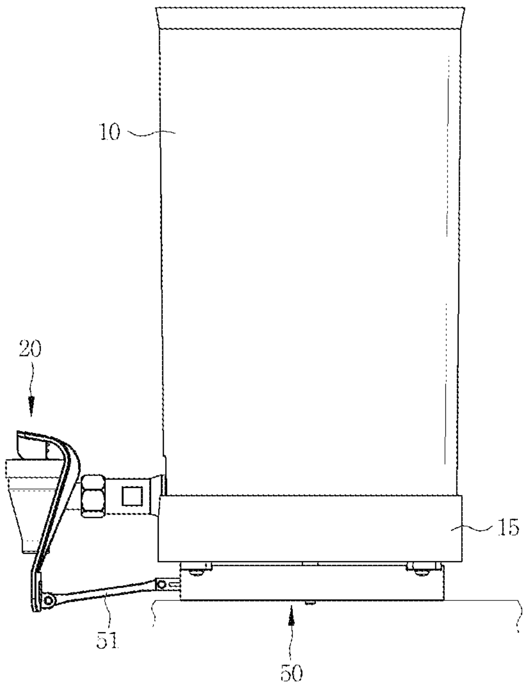
FIG. 1A is a perspective view showing an example embodiment of a beverage dispenser of a rotary agitation type.
Figure 1B:
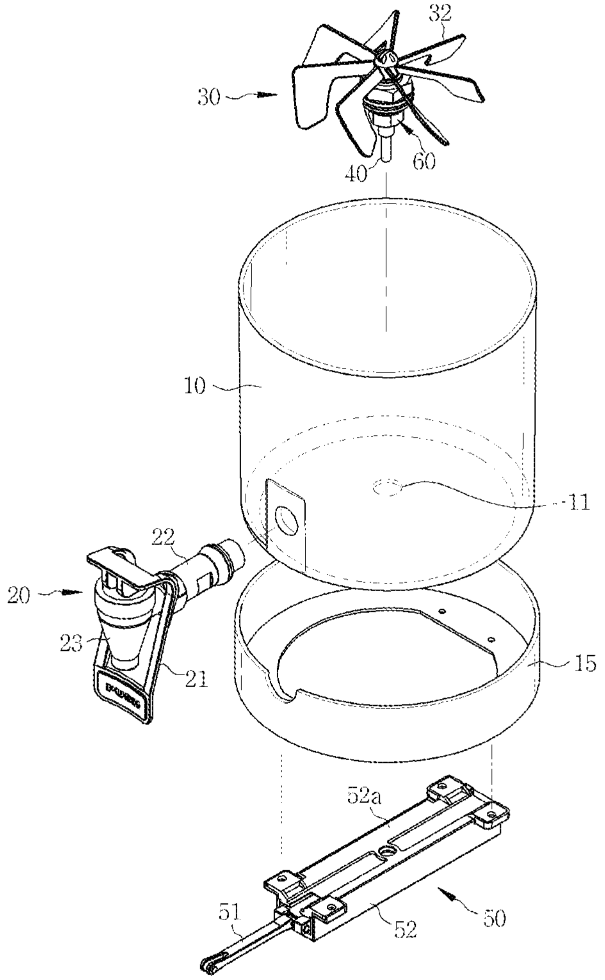
FIG. 1B is an exploded perspective view showing an example embodiment of a beverage dispenser of a rotary agitation type.
Figure 2:
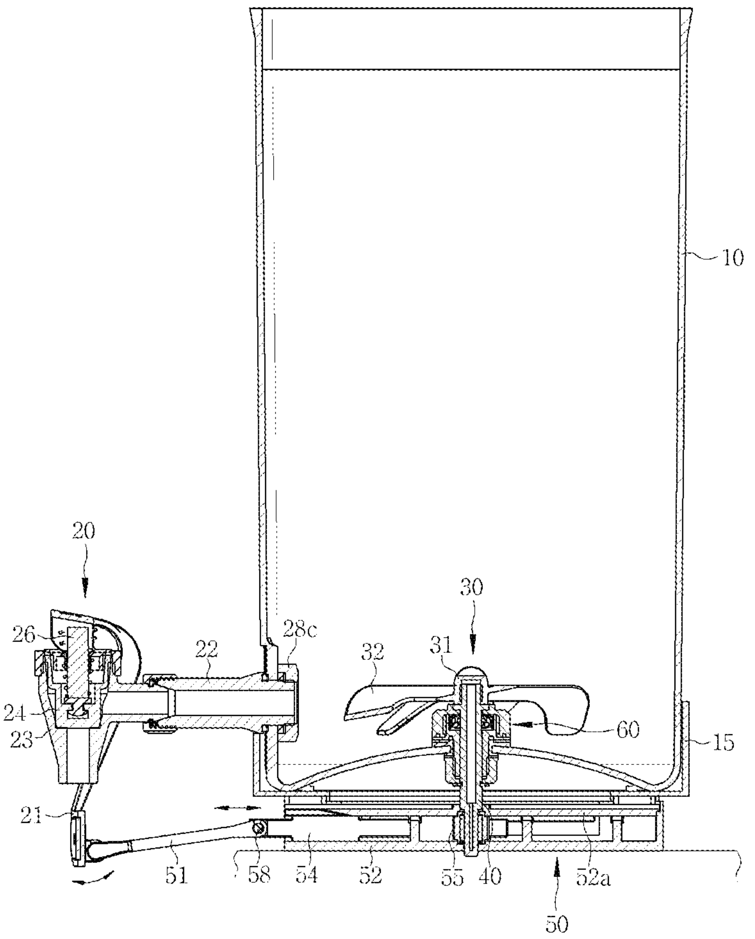
FIG. 2 is a longitudinal sectional view of an example embodiment of the beverage dispenser of a rotary agitation type of FIG. 1A.

Referring to FIGS. 1A, 1B and 2, an example embodiment of the beverage dispenser with rotary agitation includes container 10, discharge valve 20, agitator impeller 30, and agitator drive unit 50. Container 10 may be configured to receive a beverage therein. Agitator impeller 30 may be mounted in container 10 near a lower end thereof and may be adapted to agitate the beverage by rotation thereof about rotating shaft 40 that may be rotatably mounted on a bottom surface of container 10. Discharge valve 20 may be mounted to a lateral surface of container 10 near the lower end thereof so as to communicate with the interior of container 10. Discharge valve 20 may be adapted to discharge the beverage out of container 10 when operated by a user. Agitator drive unit 50 may be connected to discharge valve 20 and rotating shaft 40 of the agitator impeller 30. Agitator drive unit 50 may be adapted to rotate agitator impeller 30 in linkage with operation of discharge valve 20.

Container 10 may take the form of a cylindrical vessel in which the beverage, such as juice, may be received. Although the bottom surface of container 10 may be a flat surface, the bottom surface, of course, may be a curved surface, the center of which bulges upward as illustrated in the embodiment. Ring-shaped support member 15 may be coupled to the lower end of container 10.

Agitator impeller 30 includes hub 31 fixedly coupled to an upper end of rotating shaft 40, and a plurality of blades 32 radially extending from an outer circumferential surface of hub 31. Blades 32 may have an approximately L-shaped form, and are obliquely tilted by a predetermined angle with respect to a vertical axis. Agitator impeller 30 having the above described configuration may be rotated by agitator drive unit 50 to agitate the beverage in container 10, thereby acting to uniformly mix solid ingredients of the beverage, such as, for example, pulp, in the beverage.

Figure 3:
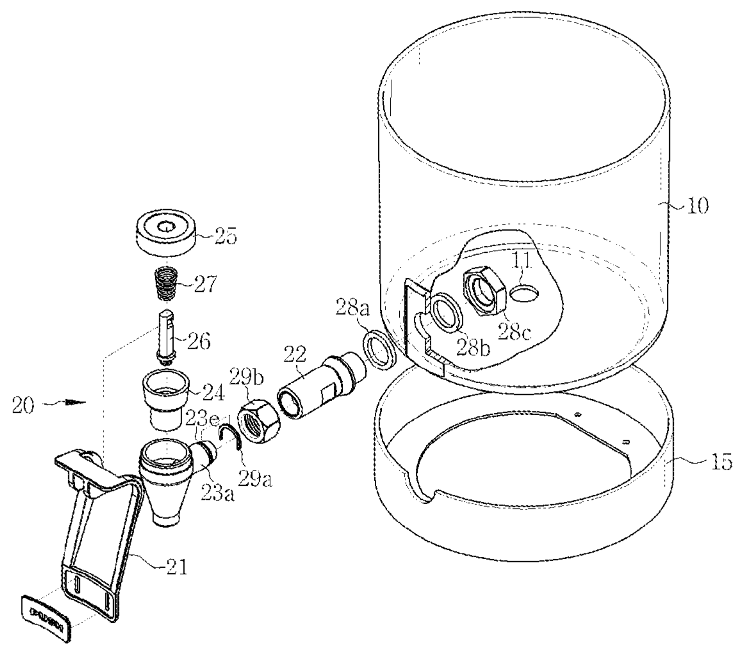
FIG. 3 is an exploded perspective view of an example embodiment of a discharge valve in the beverage dispenser of a rotary agitation type of FIG. 1A.
Figure 4:
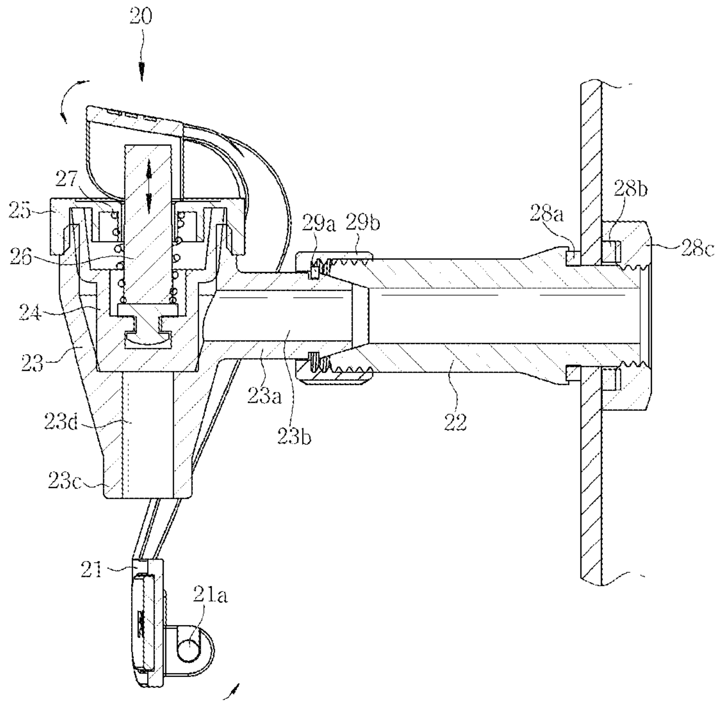
FIG. 4 is a longitudinal sectional view of an example embodiment of a coupled state of the discharge valve of FIG. 3.

As shown in the example embodiments of FIGS. 3 and 4, discharge valve 20 includes connector 22 in the form of a hollow pipe, one end of which may be coupled to the lateral surface of container 10 near the lower end thereof to communicate with the interior of container 10, and valve body 23 which includes connecting portion 23*a* coupled to the other end of the connector 22, connecting portion 23*a* internally defining supply path 23*b* that communicates with a flow path of connector 22, and conical discharge portion 23*c* internally defining downwardly extending discharge path 23*d* that communicates with supply path 23*b*. Discharge valve 20 further includes gate seal 24 which is vertically movably fitted into an upper portion of valve body 23 to open or close a connecting region between supply path 23*b* and discharge path 23*d*, valve cover 25 fixedly coupled to an upper end of valve body 23, lever shaft 26 penetrating the center of valve cover 25 to thereby be connected to gate seal 24, compression coil spring 27 configured to elastically support lever shaft 26 against valve cover 25, and operating lever 21, an upper end of which may be connected to lever shaft 26, operating lever 21 being rotated relative to valve cover 25 when the user pushes a lower end of operating lever 21 by hand or by using a cup, thereby acting to push lever shaft 26 and gate seal 24 coupled to lever shaft 26 upward.

The end of the connector 22 may be secured to a lateral wall surface of container 10 by means of first nut 23*c* that may be helically fastened inside container 10. Reference numerals 28*a* and 28*b* respectively denote an O-ring shaped seal to prevent the beverage from leaking through a coupling region between connector 22 and container 10.

The other end of connector 22 may be connected to one end of connecting portion 23*a* of valve body 23 by means of second nut 29*b*. In this case, a distal end of connecting portion 23*a* of valve body 23 may be inserted into connector 22 to thereby be firmly connected to connector 22. Moreover, to prevent valve body 23 from being rotated relative to connector 22, the distal end of connecting portion 23*a* of valve body 23 may be provided at an outer circumferential surface thereof with groove 23*e,* and C-shaped anti-rotation stopper 29*a* may be fitted into groove 23*e.*

Figure 5:
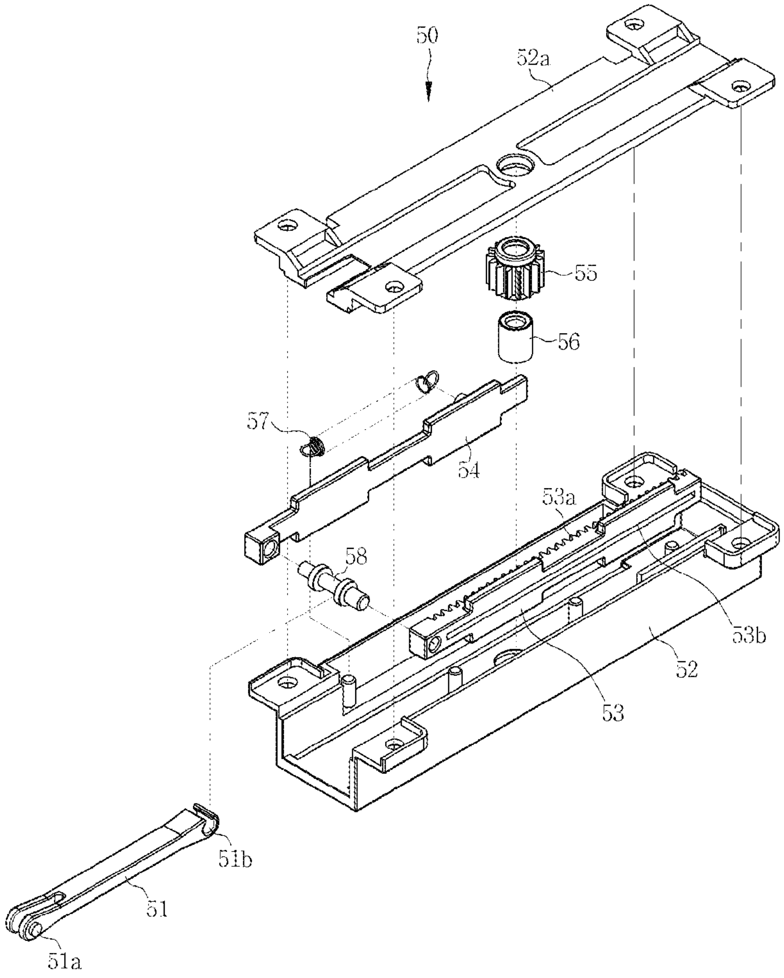
FIG. 5 is an exploded perspective view of an example embodiment of an agitator drive unit in the beverage dispenser of a rotary agitation type of FIG. 1A.
Figure 6:
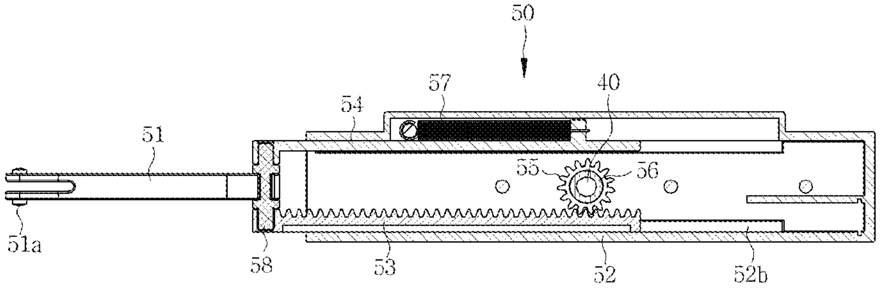
FIG. 6 is a transversal sectional view of an example embodiment of a coupled state of the agitator drive unit of FIG. 5.

Referring to FIGS. 5 and 6, agitator drive unit 50 includes link member 51 which may be movably connected to the lower end of operating lever 21 of discharge valve 20 and is adapted to move in linkage with operating lever 21, and a movement converting mechanism for converting translational movement of link member 51 into rotational movement to transmit the rotational movement to rotating shaft 40.

In an example embodiment, the movement converting mechanism includes housing 52 secured to the exterior of container 10, rack gear 53 which is connected at one end thereof to link member 51 and may be installed to perform rectilinear movement in one side of housing 52 by movement of link member 51, pinion gear 55 which may be fixedly coupled to rotating shaft 40 and is engaged with rack gear 53 so as to perform rotation, slide bar 54 which may be installed at the other side of housing 52 so as to be opposite rack gear 53, one end of slide bar 54 being connected to link member 51 such that slide bar 54 horizontally moves along with rack gear 53, and elastic member 57 which elastically supports slide bar 54 with respect to housing 52 and is adapted to return slide bar 54 and rack gear 53 to original positions thereof when external force is removed.

Link member 51 may be provided at a leading end thereof with laterally extending connection protrusion 51*a.* Connection protrusion 51*a* may be connected into connection hole 21 a formed in the lower end of operating lever 21 of discharge valve 20 so as to be rotatable relative to operating lever 21. Also, a trailing end of link member 51 may be provided with upwardly open pin connection recess 51*b,* into which hinge pin 58 may be inserted. Hinge pin 58 serves to connect rack gear 53 and a leading end of slide bar 54 to each other.

Housing 52 may have an approximately rectangular box shape. As housing 52 is coupled to housing cover 52*a* that may be fixedly coupled to support member 15 at the lower end of container 10, housing 52 may be secured around the lower end of container 10.

In an example embodiment, rack gear 53 takes the form of an elongated bar, on an inner surface of which gear teeth 53*a* are successively formed in a longitudinal direction. Rack gear 53 further has elongated longitudinal guide groove 53*b,* along which guide protrusion 52*b* protruding from a lateral surface of housing 52 is guided.

As described above, rack gear 53 and the leading end of slide bar 54 may be connected to the trailing end of link member 51 by means of hinge pin 58, so as to be rotatable relative to link member 51. Slide bar 54 may be adapted to slide along with rack gear 53 at an opposite side of rack gear 53, thereby serving to maintain balance.

Elastic member 57, used to elastically support slide bar 54, may be constituted by a tension spring, for example. In an example embodiment, as elastic member 57 is connected to slide bar 54 to apply elastic force to slide bar 54, slide bar 54 and rack gear 53 are automatically returned to original positions thereof when external force is removed after sliding movement of slide bar 54 and rack gear 53. However, alternatively, elastic member 57 may be connected to rack gear 53 to ensure that rack gear 53 is automatically returned to an original position thereof when external force is removed after movement of rack gear 53.

Although pinion gear 55 may be directly connected to rotating shaft 40, pinion gear 55 may be connected to rotating shaft 40 by means of one-way bearing 56 as proposed in an example embodiment. O one-way bearing 56 may be restricted in counterclockwise rotation as shown in the drawing, and thus causes rotating shaft 40 to be rotated along with pinion gear 55 when rack gear 53 moves rightward as shown in the drawing as the user moves operating lever 21. However, one-way bearing 56 may be freely rotatable in a clockwise direction as shown in the drawing, and thus does not cause rotation of rotating shaft 40 when rack gear 53 is returned to an original position thereof.

Figure 7:
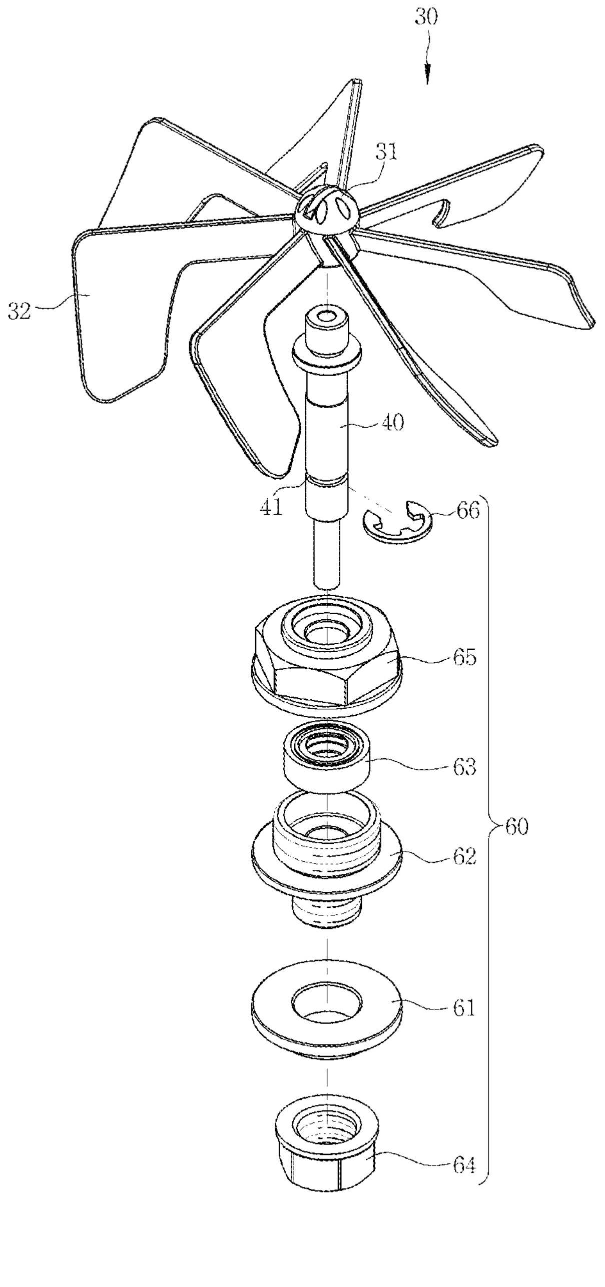
FIG. 7 is an exploded perspective view of an example embodiment of an agitator impeller and a sealing unit in the beverage dispenser of a rotary agitation type of FIG. 1A.
Figure 8:
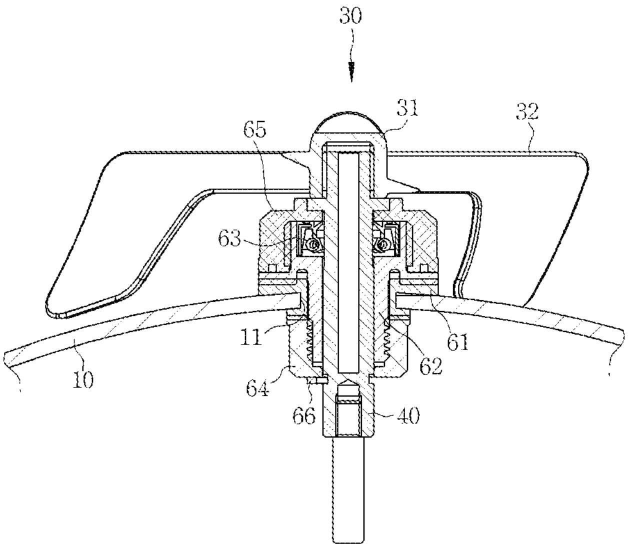
FIG. 8 is a longitudinal sectional view of an example embodiment of the agitator impeller and the sealing unit of FIG. 7.

Sealing unit 60 may be installed at a connection region between rotating shaft 40 and the container 10 and may be adapted to rotatably support rotating shaft 40 while preventing leakage of the beverage out of container 10. FIGS. 7 and 8 show an example embodiment of sealing unit 60. Sealing unit 60 according to the example embodiment includes ring-shaped main seal 61, shaft holder 62, ring-shaped auxiliary seal 63, outer fixing nut 64, and inner fixing nut 65. Main seal 61 may be formed of a flexible resin material and may be coupled to an inner circumference of through-hole 11 perforated in the bottom of container 10, through which rotating shaft 40 passes. Shaft holder 62 may be inserted into a hole of main seal 61 and has a hole through which rotating shaft 40 penetrates to thereby be fitted into shaft holder 62. Auxiliary seal 63 may be inserted into the hole of shaft holder 62 and may be formed of a flexible resin material that comes into close contact with an outer circumferential surface of rotating shaft 40. Outer fixing nut 64 may be fitted around rotating shaft 40 at the outside of container 10 and may be helically fastened to an outer end of the shaft holder 62. Inner fixing nut 65 may be fitted around rotating shaft 40 within container 10 and is helically fastened to an inner end of shaft holder 62.

A lower end of rotating shaft 40 may be provided at an outer circumferential surface thereof with groove 41, into which E-ring 66 is fitted to prevent separation of rotating shaft 40.

Main seal 61 may be formed of a flexible material, such as rubber or silicon, and may be configured to come into close contact with the inner bottom surface and the outer lower surface of container 10 to prevent leakage of the beverage from through-hole 11 of container 10.

Auxiliary seal 63 may be closely fitted between shaft holder 62 and the outer circumferential surface of rotating shaft 40. Auxiliary seal 63 may serve to prevent leakage of the beverage between the outer circumferential surface of rotating shaft 40 and an inner circumferential surface of shaft holder 62. Auxiliary seal 63 preferably takes the form of an oil seal.

The beverage dispenser having the above described configuration may be operated as follows. If a user who wishes to drink a beverage pushes operating lever 21 of discharge valve 20 rearward by hand or by using a cup, operating lever 21 may be pivotally rotated about a contact point with valve cover 25 at the upper end thereof, thereby acting to upwardly push lever shaft 26 and consequently, gate seal 24. In this way, discharge path 23*d* of valve body 23 is opened, thereby allowing the beverage in container 10 to be discharged outward.

In this example embodiment, link member 51 connected to the lower end of operating lever 21 may be moved rearward by the rearward movement of operating lever 21, and rack gear 53 and slide bar 54, which are connected to link member 51, simultaneously slide rearward within housing 52. In this way, pinion gear 55 engaged with rack gear 53 may be rotated, thereby causing rotating shaft 40 to be rotated.

As rotating shaft 40 is rotated, agitator impeller 30 coupled to the upper end of rotating shaft 40 may be rotated to agitate the beverage, which ensures that the beverage containing solid ingredients, such as pulp, for example, is discharged in a uniformly mixed state with the pulp.

As is apparent from the above description, according to example embodiments, rotation of agitator impeller 30 using mechanical force may be realized in linkage with an operation of opening discharge valve 20 to allow the user to drink a beverage. As a result, the beverage within container 10 can be agitated only by mechanical operation without using electricity, which may avoid complexity in design and configuration due to the use of electricity, and may ensure that the agitator impeller is free from requirements in relation to electricity safety criteria.

Although technical features of the systems and methods of beverage dispensing with rotary agitation have been disclosed with reference to the accompanying drawings, the disclosure is given based on example embodiments for illustrative purposes and the present disclosure is not limited thereto. Also, those skilled in the art will appreciate that various modifications, additions and substitutions are possible, without departing from the scope and spirit of the disclosure as disclosed in the accompanying claims.

Therefore, at least the following is claimed:

1. A beverage dispenser of a rotary agitation type, comprising:

a container in which a beverage is received;

an agitator impeller mounted in the container, the agitator impeller adapted to agitate the beverage by rotation thereof about a rotating shaft that is rotatably mounted on a surface of the container;

a discharge valve mounted to one side of the container so as to communicate with an interior of the container, the discharge valve adapted to discharge the beverage out of the container when operated by a user; and an agitator drive unit connected to the discharge valve and the rotating shaft of the agitator impeller, the agitator drive unit adapted to rotate the agitator impeller in linkage with operation of the discharge valve, the agitator drive unit comprising a link member movably connected to an operating lever that is provided at the discharge valve so as to be operated by the user; and a movement converting mechanism for converting translational movement of the link member into rotational movement to thereby transmit the rotational movement to the rotating shaft, the movement converting mechanism comprising a housing secured to an exterior of the container; a rack gear connected at one end thereof to the link member, the rack gear installed to perform rectilinear movement in the housing by movement of the link member; a pinion gear fixedly coupled to the rotating shaft while engaged with the rack gear so as to perform rotation, and a slide bar installed at one side of the housing so as to be opposite the rack gear, one end of the slide bar connected to the link member such that the slide bar horizontally moves along with the rack gear.

2. The beverage dispenser according to claim 1, wherein the movement converting mechanism further comprises an elastic member configured to elastically support the rack gear with respect to the housing so as to return the rack gear to an original position thereof when external force is removed.

3. The beverage dispenser according to claim 1, wherein the movement converting mechanism further comprises an elastic member configured to elastically support the slide bar or the rack gear with respect to the housing so as to return the slide bar and the rack gear to original positions thereof when external force is removed.

4. The beverage dispenser according to claim 1, wherein the housing has a guide protrusion protruding in a movement direction of the rack gear, and the rack gear has a longitudinal guide groove, into which the guide protrusion is inserted for guidance.

5. The beverage dispenser according to claim 1, wherein the pinion gear is coupled to one end of the rotating shaft by means of a one-way bearing that is rotatable in a given direction, but is restricted in rotation in an opposite direction.

6. The beverage dispenser according to claim 1, further comprising a sealing unit installed at a connecting region between the rotating shaft and the container, the sealing unit adapted to rotatably support the rotating shaft while preventing leakage of the beverage out of the container.

7. The beverage dispenser according to claim 6, wherein the sealing unit comprises:

a ring-shaped main seal formed of a flexible resin material, the ring-shaped main seal coupled to an inner circumference of a through-hole perforated in the surface of the container, through which the rotating shaft passes;

a shaft holder inserted into a hole of the ring-shaped main seal, the shaft holder comprising a hole through which the rotating shaft penetrates to thereby be fitted into the shaft holder;

a ring-shaped auxiliary seal inserted into the hole of the shaft holder, the ring-shaped auxiliary seal formed of a flexible resin material that comes into close contact with an outer circumferential surface of the rotating shaft;

an outer fixing nut fitted around the rotating shaft at the outside of the container, the outer fixing nut helically fastened to an outer end of the shaft holder; and an inner fixing nut fitted around the rotating shaft within the container, the inner fixing nut helically fastened to an inner end of the shaft holder.

8. A method of dispensing a beverage, comprising:

providing a beverage in a container;

agitating the beverage with an agitator impeller, the agitator impeller adapted to agitate the beverage by rotation thereof about a rotating shaft that is rotatably mounted on a surface of the container;

rotating the agitator and discharging the beverage when a discharge valve is operated;

converting translational movement of a link member into rotational movement of the rotating shaft, the link member movably connected to an operating lever connected to the discharge valve;

elastically supporting a rack gear that performs rectilinear movement in a housing secured to an exterior of the container due to movement of the link member, the elastically supporting in respect to the housing and configured to return the rack gear to an original position when an external force is removed; and moving a slide bar horizontally along with the rack gear, the slide bar installed on a side of the housing opposite the rack gear with an end of the slide bar connected to the link member.

9. A system, comprising:

an agitator impeller mounted in a container, the agitator impeller adapted to agitate the beverage by rotation thereof about a rotating shaft that is rotatably mounted on a surface of the container;

a discharge valve mounted to one side of the container so as to communicate with an interior of the container, the discharge valve adapted to discharge the beverage out of the container when operated by a user;

an agitator drive unit connected to the discharge valve and the rotating shaft of the agitator impeller, the agitator drive unit adapted to rotate the agitator impeller in linkage with operation of the discharge valve;

a link member movably connected to an operating lever that is provided at the discharge valve so as to be operated by the user; and a movement converting mechanism for converting translational movement of the link member into rotational movement to thereby transmit the rotational movement to the rotating shaft, the movement converting mechanism comprising a housing secured to an exterior of the container; a rack gear connected at one end thereof to the link member, the rack gear installed to perform rectilinear movement in the housing by movement of the link member; and a pinion gear fixedly coupled to the rotating shaft while engaged with the rack gear so as to perform rotation; and a slide bar installed at one side of the housing so as to be opposite the rack gear, one end of the slide bar connected to the link member such that the slide bar horizontally moves along with the rack gear.

10. The system of claim 9, wherein the movement converting mechanism further comprises an elastic member configured to elastically support the rack gear with respect to the housing so as to return the rack gear to an original position thereof when external force is removed.

11. The system of claim 9, wherein the movement converting mechanism further comprises an elastic member configured to elastically support the slide bar or the rack gear with respect to the housing so as to return the slide bar and the rack gear to original positions thereof when external force is removed.

* * * * *